US011075698B2

(12) United States Patent
Liu et al.

(10) Patent No.: US 11,075,698 B2
(45) Date of Patent: Jul. 27, 2021

(54) OPTICAL COMMUNICATION SYSTEM

(71) Applicant: Huawei Technologies Co., Ltd., Shenzhen (CN)

(72) Inventors: Xiang Liu, Marlboro, NJ (US); Ning Cheng, Basking Ridge, NJ (US); Frank Effenberger, Frisco, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/983,259

(22) Filed: Aug. 3, 2020

(65) Prior Publication Data
US 2020/0366374 A1 Nov. 19, 2020

Related U.S. Application Data

(63) Continuation of application No. PCT/CN2019/091210, filed on Jun. 14, 2019.
(Continued)

(51) Int. Cl.
*H04B 10/04* (2006.01)
*H04B 10/50* (2013.01)
(Continued)

(52) U.S. Cl.
CPC ......... *H04B 10/504* (2013.01); *H04B 10/564* (2013.01); *H04B 10/572* (2013.01); *H04L 25/03006* (2013.01)

(58) Field of Classification Search
CPC .. H04B 10/504; H04B 10/564; H04B 10/572; H04B 10/40; H04B 10/5057; H04B 10/50577; H04B 10/2507; H04B 10/25137
(Continued)

(56) References Cited

U.S. PATENT DOCUMENTS 7,433,605 B2   10/2008  Mahgerefteh et al.
7,536,113 B2*   5/2009  Matsui ............... H04B 10/504
                                                    398/185
(Continued)

OTHER PUBLICATIONS

Keysight Technologies, "Using Equalization Techniques on Your Infiniium 90000A Series Oscilloscope—Application Note," [www.keysight.com], Jul. 31, 2014, 29 pages.
(Continued)

*Primary Examiner* — Hanh Phan
(74) *Attorney, Agent, or Firm* — Vierra Magen Marcus LLP

(57) ABSTRACT

The disclosure relates to technology for signal transmission in an optical communication system. An optical transmitter comprises a directly modulated laser (DML) configured to generate a modulated optical signal in response to a modulation signal. The modulated optical signal comprises a first frequency corresponding to a logical one value in the modulation signal and a second frequency corresponding to a logical zero value in the modulation signal. The modulated optical signal has a modulation symbol rate of "R". The transmitter comprises a controller configured to control the DML to establish a target frequency gap between the first frequency and the second frequency. The transmitter also comprises an optical band pass filter (OBPF) coupled to the DML to receive the modulated optical signal and output a filtered optical signal. The OBPF has a 3-dB bandwidth of less than R.

20 Claims, 10 Drawing Sheets

Related U.S. Application Data

(60) Provisional application No. 62/735,540, filed on Sep. 24, 2018.

(51) Int. Cl.
*H04B 10/564* (2013.01)
*H04B 10/572* (2013.01)
*H04L 25/03* (2006.01)

(58) Field of Classification Search
USPC ....... 398/182, 183, 185, 187, 186, 192, 193, 398/194, 195, 196, 197, 198, 199, 201, 398/158, 159, 135, 136, 137, 138, 139, 398/140; 372/32, 34, 36, 38.02
See application file for complete search history.

(56) References Cited

U.S. PATENT DOCUMENTS

| | | |
|---|---|---|
| 7,558,488 B2 | 7/2009 | Matsui et al. |
| 7,639,955 B2 | 12/2009 | Zheng et al. |
| 7,809,280 B2 | 10/2010 | Mahgerefteh et al. |
| 8,116,637 B2* | 2/2012 | Oomori ............... H04B 10/504 398/196 |
| 2006/0002718 A1 | 1/2006 | Matsui et al. |
| 2006/0078338 A1* | 4/2006 | Johnson ............... H04B 10/58 398/187 |

OTHER PUBLICATIONS

Mahgerefteh, Daniel, et al., "Chirp Managed Laser and Applications," IEEE Journal of Selected Topics in Quantum Electronics, vol. 16, No. 5, Sep./Oct. 2020, 14 pages.

\* cited by examiner

OPTICAL COMMUNICATION SYSTEM

PRIORITY CLAIM

This application is a continuation of PCT Patent Application No. PCT/CN2019/091210, filed Jun. 14, 2019 by Liu et al., entitled "OPTICAL COMMUNICATION SYSTEM, which claims priority to U.S. Provisional Patent Application No. 62/735,540 filed Sep. 24, 2018 by Liu et al., entitled "OPTICAL COMMUNICATION SYSTEM," both of which are incorporated by reference herein in their entirety.

FIELD

The disclosure generally relates to signal transmission in an optical communication system, including a fiber-optic communication system.

BACKGROUND

Dispersion is a significant factor limiting the quality of optical signal transmission in a fiber-optic communication system. One example is chromatic dispersion due to the different speeds at which different wavelengths of light travel in an optical transmission fiber. Typically, laser sources are used to create input light pulses. Although the input light pulse created by a laser is spectrally thin, the input light pulse will still contain more than one wavelength component. These wavelength components may travel at different speeds through the optical transmission fiber. The optical signal may travel tens of kilometers through optical transmission fiber before reaching a receiver. The dispersion may result in a substantial spreading or broadening of light pulses, and thus inter-symbol interference (ISI), which may result in a higher than desirable bit error rate at the receiver. In general, as the transmission bit rate in a fiber-optic communication system increases, symbol period reduces and signal spectrum broadens, and thus the acceptable tolerance of dispersion decreases.

BRIEF SUMMARY

According to a first aspect of the present disclosure, there is provided an optical transmitter. The transmitter comprises a directly modulated laser (DML) configured to generate a modulated optical signal in response to a modulation signal. The modulated optical signal comprises a first frequency corresponding to a logical one value in the modulation signal and a second frequency corresponding to a logical zero value in the modulation signal. The modulated optical signal has a modulation symbol rate of "R". The transmitter comprises a controller configured to control the DML to establish a target frequency gap between the first frequency and the second frequency. The transmitter also comprises an optical band pass filter (OBPF) coupled to the DML to receive the modulated optical signal and output a filtered optical signal. The OBPF has a 3-dB bandwidth of less than R.

Optionally, in a second aspect, the controller is further configured to establish the target frequency gap based on power of the filtered optical signal output from the OBPF.

Optionally, in a third aspect, the controller is further configured to lock the OBPF with the DML based on power of the filtered optical signal output from the OBPF.

Optionally, in a fourth aspect in accordance with any of the first to third aspects, the controller is further configured to tune the OBPF to maximize power of the filtered optical signal output from the OBPF to lock the DML with the OBPF.

Optionally, in a fifth aspect in accordance with any of the first to fourth aspects, the controller is further configured to adjust a peak transmission frequency of the OBPF to maximize power of the filtered optical signal output from the OBPF to lock the DML with the OBPF.

Optionally, in a sixth aspect in accordance with any of the first to fifth aspects, the controller is further configured to control the DML to establish the target frequency gap of the optical signal output by the DML to be between 0.3 R and 0.5 R.

Optionally, in a seventh aspect in accordance with any of the first to sixth aspects, the OBPF has a 3-dB bandwidth of approximately R/2.

Optionally, in an eighth aspect in accordance with any of the first to seventh aspects, the OBPF comprises a micro-ring resonator (MRR).

Optionally, in a ninth aspect in accordance with the eighth aspect, the MRR comprises a single-ring MRR.

Optionally, in a tenth aspect in accordance with the ninth aspect, the single-ring MRR has a free spectral range (FSR) of about 200 GHz.

Optionally, in an eleventh aspect accordance with the eighth aspect, the MRR comprises a multi-ring MRR.

Optionally, in a twelfth aspect in accordance with the eleventh aspect, the multi-ring MRR has a free spectral range (FSR) of about 100 GHz.

Optionally, in a thirteenth aspect in accordance with any of the eighth to twelfth aspects, the MRR comprises a silicon nitride (SiN) optical resonator ring.

Optionally, in a fourteenth aspect in accordance with any of the eighth to thirteenth aspects, the MRR comprises an optical waveguide having input cross-section waveguide dimensions matched with cross-section dimensions of an output of the DML.

Optionally, in a fifteenth aspect in accordance with any of the first to fourteenth aspects, the controller is further configured to tune a first drive current of the DML for generating the logical one values and tune a second drive current of the DML for generating the logical zero values to establish the target frequency gap between the first frequency and the second frequency of the optical signal.

Optionally, in a sixteenth aspect in accordance with the fifteenth aspect, the controller is further configured to set a bias current of the DML equal to the mathematical mean of the first drive current and the second drive current.

Optionally, in a seventeenth aspect in accordance with any of the first to sixteenth aspects, the controller is further configured to drive the DML with either a first drive current that is used to generate the logical one values or a second drive current that is used to generate the logical zero values. The controller is further configured to align the optical signal to a peak transmission frequency of the OBPF when driving the DML with either the first drive current or the second drive current. The controller is further configured to drive the DML with the other one of the first drive current or the second drive current after the optical signal has been aligned to the peak transmission frequency of the OBPF. The controller is further configured to determine a first power of the optical signal when driving the DML with the other one of the first drive current or the second drive current. The controller is further configured to align the optical signal to the peak transmission frequency of the OBPF when driving the DML with the other one of the first drive current or the second drive current. The controller is further configured to determine a second power of the optical signal with the optical signal aligned to the peak transmission frequency of the OBPF when driving the DML with the other one of the first drive current or the second drive current. The controller is further configured to compare the difference between the first power and the second power to a target loss difference between a peak transmittance of the OBPF and a transmittance of the OBPF at a frequency that is away from a peak transmittance frequency by the target frequency gap. The controller is further configured to adjust the first and/or second drive currents until the difference between the first power and the second power is substantially equal to the target loss difference in order to establish the target frequency gap.

According to one other aspect of the present disclosure, there is provided an optical communication system. The optical communication system comprises an optical transmitter, comprising a directly modulated laser (DML) configured to generate a modulated optical signal in response to a modulation signal. The modulated optical signal comprises a first frequency corresponding to a logical one value in the modulation signal and a second frequency corresponding to a logical zero value in the modulation signal. The modulated optical signal has a modulation symbol rate of "R". The optical transmitter further comprises a controller configured to control the DML to establish a target frequency gap between the first frequency and the second frequency. The optical transmitter further comprises an optical band pass filter (OBPF) coupled to the DML to receive the modulated optical signal and output a filtered optical signal. The OBPF has a 3-dB bandwidth of less than R. The optical communication system further comprises an optical receiver communicatively coupled to the optical transmitter and configured to receive the filtered optical signal and pass the filtered optical signal through an equalizer. The equalizer is configured to compensate for a bandwidth limitation in the filtered optical signal caused by the OBPF.

According to one other aspect of the present disclosure, there is provided method for fiber-optic communication. The method comprises directly modulating a laser to generate an optical signal having a first frequency that corresponds to transmission of logical ones in modulation signal and a second frequency that corresponds to transmission of logical zeroes in the modulation signal. The optical signal has a modulation symbol rate of "R". The method comprises controlling the laser to establish a target frequency gap between the first frequency and the second frequency of the optical signal. The method comprises filtering the optical signal with an optical band pass filter (OBPF). The OBPF has a 3-dB bandwidth of less than R.

According to still one other aspect of the present disclosure, there is provided a passive optical network (PON) for fiber-optic communication. The PON comprises an optical line termination (OLT) comprising: a directly modulated laser (DML), a controller, and an optical band pass filter (OBPF). The DML is configured to output an optical signal in response to a modulation signal. The optical signal has a first frequency that corresponds to transmission of logical ones in the modulation signal and a second frequency that corresponds to transmission of logical zeroes in the modulation signal. The optical signal has a modulation symbol rate of "R". The controller is configured to control the DML to establish a target frequency gap between the first frequency and the second frequency of the optical signal. The OBPF is optically coupled to the DML to receive the optical signal and to output a filtered optical signal. The OBPF has a 3-dB bandwidth of less than R. The PON also comprises an optical distribution network (ODN) comprising: a plurality of optical transmission fibers and a plurality of passive optical splitters. The optical transmission fibers comprise a feed fiber optically coupled to the OBPF to receive the filtered optical signal, and a plurality of drop fibers. The passive optical splitters are configured to route the filtered optical signal through the plurality of optical transmission fibers. The PON also comprises a plurality of optical network terminations (ONTs) each optically coupled to one of the drop fibers to receive the filtered optical signal. One or more of the ONTs comprises an equalizer configured to compensate for a bandwidth limitation in the filtered optical signal caused by the OBPF.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
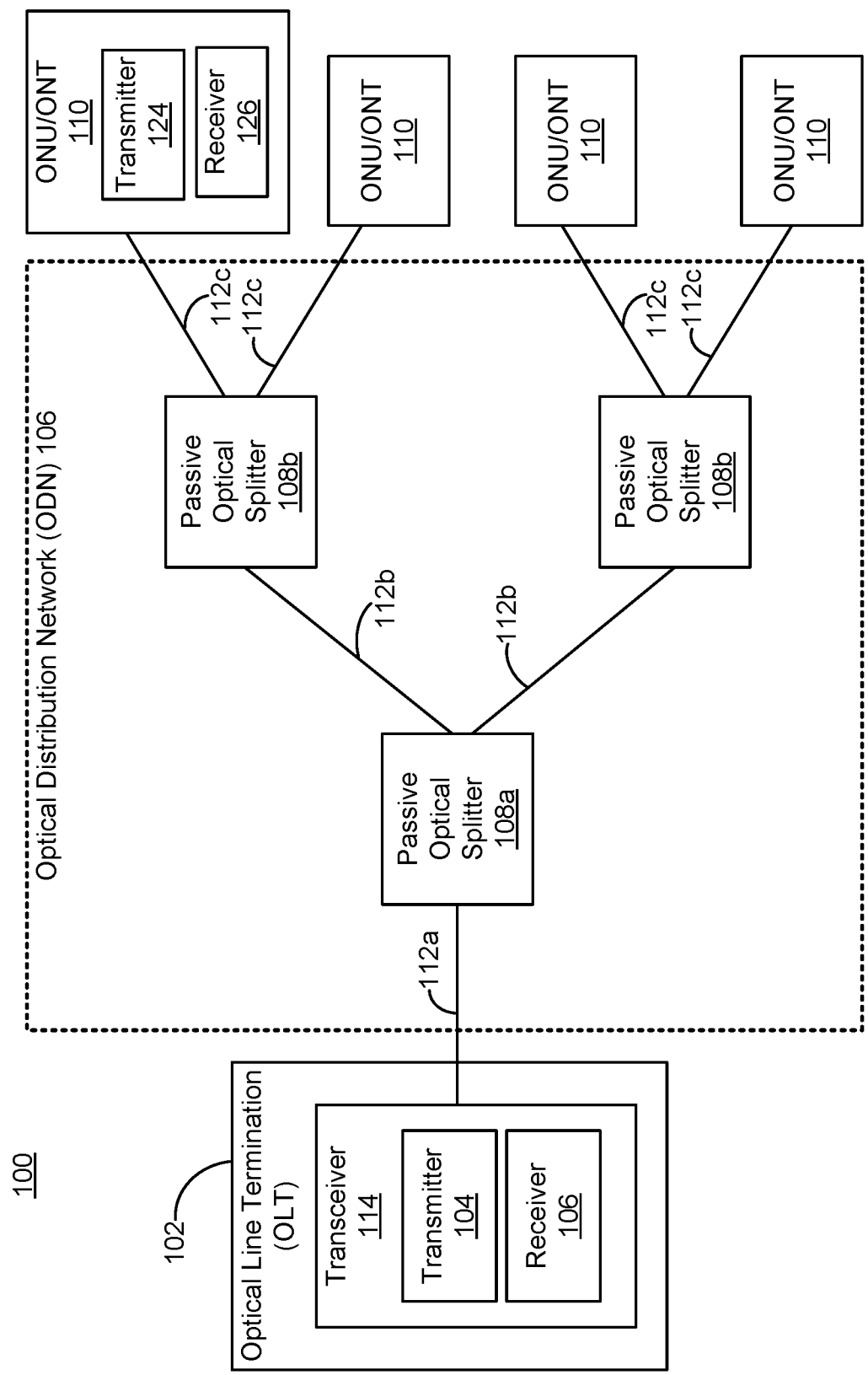
FIG. 1 illustrates a passive optical network (PON) system.

The present disclosure will now be described with reference to the figures, which in general relate to transmission of optical signals in a fiber-optic communication system.

An embodiment of the invention is a system for fiber-optic communication that includes a directly modulated laser (DML), an optical band pass filter (OBPF), and an equalizer. The DML is configured to output an optical signal having a first frequency that corresponds to transmission of logical ones and a second frequency that corresponds to transmission of logical zeroes. For digital optical communications, the DML is used for generating optical signals representing digital one and digital zero values. The DML is therefore used to output a first optical frequency to represent a digital zero value and to output a second optical frequency to represent a digital one value. The two optical frequencies (or frequency peaks or spectrums) should be separated and not contiguous or overlapping. Typically, the DML is configured to space the first and second optical frequencies apart by a predetermined gap amount to make reception and discrimination of the digital values easier (see FIG. 3 and the accompanying text). In one embodiment, a first DML drive current is used to generate the logical one values, and a second DML drive current is used to generate the logical zero values. The generated optical signal has a frequency spectrum with a frequency gap between the first frequency and the second frequency of the optical signal of between 0.3 R and 0.5 R, wherein R is the modulation symbol rate of the optical signal, in one embodiment. This frequency gap may also be referred to as the adiabatic chirp of the directly modulated laser (DML). The optical signal may have a relatively high extinction ratio before it is filtered by the OBPF. The extinction ratio is defined as the ratio between the power of the first frequency and the power of the second frequency. In one embodiment, the extinction ratio is greater than 3 dB before the optical signal is filtered by the OBPF. A high extinction ratio may be desirable to achieve sufficient frequency gap between the first frequency and the second frequency of the optical signal.

The OBPF is a relatively narrow bandwidth filter, which may help to further increase dispersion tolerance. The OBPF may increase the extinction ratio of the optical signal by attenuating one frequency of the optical signal more than the other frequency of the optical signal, in one embodiment. The OBPF has a 3-dB bandwidth of less than the modulation symbol rate (R) of the optical signal, in one embodiment. However, note that the bandwidth narrowness of the OBPF may introduce a bandwidth limitation on the optical signal. For example, the narrowness of the OBPF may cause inter-symbol interference in the optical signal as the optical signal propagates through an optical transmission medium.

In one embodiment, the DML is tuned to establish a target frequency gap in the optical signal, with the target adiabatic chirp having two distinct frequency peaks that are separated by a predetermined gap. Establishing the target frequency gap includes adjusting the DML based on measurements of the optical signal power at the output of the OBPF under certain conditions, in one embodiment. Establishing the target frequency gap may include learning DML drive currents for transmitting ones and zeroes, in one embodiment.

In one embodiment, the OBPF is locked with the DML based on the power of the filtered optical signal that is outputted from the OBPF. To lock the OBPF with the DML means to achieve a target alignment of the spectral content of the optical signal with the transfer function of the OBPF. In one embodiment, the OBPF is tuned for maximum power of the optical signal at the output of the OBPF to lock the OBPF with the DML. This tuning can properly align the frequency gap relative to the transfer function of the OBPF. For example, the first frequency and the second frequency of the optical signal may be aligned relative to the transfer function of the OBPF. The tuning can be achieved with a simple feedback circuit, which samples the power of the optical signal at the output of the OBPF and controls the OBPF and/or the DML to maximize the power of the optical signal.

An equalizer is used at a receiver end of the system for fiber-optic communication to compensate for a bandwidth limitation on the optical signal that is introduced by the OBPF, in one embodiment. In one embodiment, the equalizer is used to compensate for inter-symbol interference in the optical signal that is introduced by the OBPF. In one embodiment, the equalizer comprises a multi-tap feed-forward equalizer (FFE).

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates a passive optical network (PON) system 100. PON technology is an optical access technology developed to support point-to-multipoint applications. As shown in FIG. 1, a PON system 100 includes three parts: an Optical Line Termination (OLT) 102, an Optical Distribution Network (ODN) 106, and at least one Optical Network Unit (ONU)/Optical Network Termination (ONT) 110. The OLT 102 may reside in a central office. The ONU/ONTs 110 may reside in or near user premises. The ODN 106 comprises optical fiber 112 (which is shown in FIG. 1 as including fiber elements 112a, 112b, and 112c, discussed below), and passive optical splitters 108a, 108b. The ODN 106 is located between the OLT 102 and ONU/ONTs 110. Optical fiber provides significantly improved bandwidth capacity over technologies such as copper cable and wireless Local Area Networks (LANs). The PON 100 may be used to transmit a wide range of data including, but not limited to, data access services, voice service, digital video service such as internet protocol television (IPTV), video on demand, conventional video services such as cable television and digital television, security data, and utility meter reading links to residential users.

The OLT 102 provides a network side interface for the PON system 100, and is connected to one or more ODNs 106. The OLT 102 includes a transceiver 114 that has a transmitter 104 used to transmit an optical signal into the ODN 106, as well as a receiver 126 used to receive an optical signal from the ODN 106. Thus, the PON 100 is capable of bi-directional data transfer A link from the OLT 102 to the ONU/ONTs 110 is referred to as a downlink, and a link from a ONU/ONT 110 to the OLT 102 is referred to as an uplink.

The same optical fiber can be used to for the uplink and the downlink. In one embodiment, the PON system uses wavelength division multiplexing (WDM), using one wavelength for downstream traffic and another for upstream traffic. In one embodiment, downstream traffic uses the 1342 nanometer (nm) wavelength. In another embodiment, downstream traffic uses the 1358 nm wavelength. However, other wavelengths may be used for downstream traffic. In one embodiment, the PON system 100 uses the 1278 nanometer (nm) wavelength for upstream traffic. In one embodiment, the PON system 100 uses the 1310 nanometer (nm) wavelength for upstream traffic. However, other wavelengths may be used for upstream traffic.

The ODN 106 includes passive optical splitters 108a, 108b and optical fiber 112, as noted above. The optical fiber includes feed fiber 112a, which optically connects the OLT 102 to passive optical splitter 108a; distribute fiber 112b, which optically connects the passive optical splitter 108a to passive optical splitters 108b, and drop fiber 112c, which optically connects the passive optical splitters 108b to the ONU/ONTs 110. The distribution fiber 112b and the drop fiber 112c may be collectively referred to as branch fibers, or individually as a branch fiber. The reference numeral 112 may be used to refer to optical fiber when not referring specifically to feed fiber 112a, distribute fiber 112b, or drop fiber 112c. The passive optical splitters 108 may be configured to route the optical signal from the OLT 102 to the ONU/ONT 110. For example, passive optical splitter 108a may receive the optical signal from feed fiber 112a and divide the power of the optical signal onto each of the distribute fibers 112b. Passive optical splitters 108b may receive the optical signal from distribute fibers 112b and divide the power of the optical signal onto the drop fibers 112c. The passive optical splitters 108 may split the optical signal into more than two signals. FIG. 1 is a structural diagram of an ODN 106 with level-2 splitting. However, there could be more or fewer levels of splitting. The ODN 106 is one example of an optical fiber network.

The ONU/ONTs 110 terminate the PON 100 and may provide an interface to customer equipment (not depicted in FIG. 1). An ONU/ONT 110 contains a receiver 126 that is configured to receive and process the optical signal from the ODN 106. An ONU/ONT 110 may optionally contain a transmitter 124 that is configured to transmit an optical signal into the ODN 106. For example, ONU/ONT 110 may convert between optical signals (to/from ODN 106) and electrical signals (from/to customer equipment). A ONU/ONT 110 may be bridged to customer equipment using technologies such as Ethernet, phone lines, coaxial cables, Wi-Fi, etc.

Figure 2:
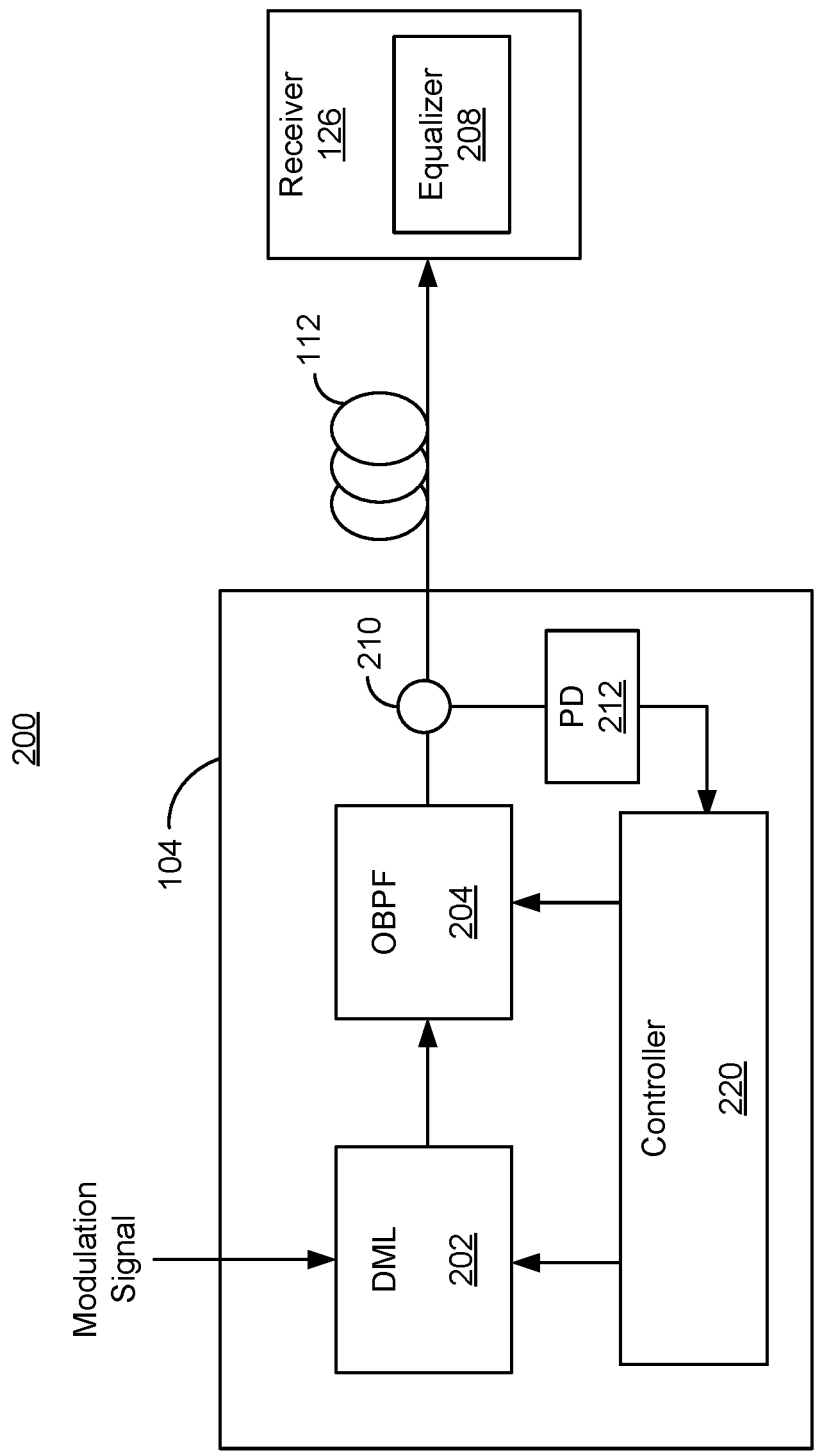
FIG. 2 is a diagram of an embodiment of an optical communication system.

FIG. 2 is a diagram of an embodiment of an optical communication system 200. The optical communication system 200 includes a transmitter 104, optical transmission medium 112 (such as an optical fiber or air, for example), and receiver 126. The optical communication system 200 may be used within the PON 100 of FIG. 1, but is not limited to the PON 100. The transmitter 104 may be used within the transceiver 114 of the OLT 102. The optical fiber 112 may be used in the ODN 106. The receiver 126 may be used within one of the ONU/ONT 110.

The transmitter 104 includes a directly modulated laser (DML) 202, an optical bandpass filter (OBPF) 204, a tap 210, a photodetector 212, and a controller 220. A modulation signal is used to modulate the DML 202, with the modulation signal comprising a signal controlling the modulation of an optical signal by the DML 202. The modulation signal is encoded with or comprises data to be transmitted from the transmitter 104 to the receiver 126, in one embodiment. The modulation signal comprises a sequence of logical ones and logical zeroes, in one embodiment. The logical ones may be represented by a high voltage level and the logical zeroes by a low voltage level, in one embodiment. Alternatively, the logical zeroes may be represented by a high voltage level and the logical ones by a low voltage level in the modulation signal. The modulation signal is used to modulate the drive current of the DML 202, in one embodiment. One of the logical values (e.g., "1") is used for an "on current" of the DML 202 with the other logical value (e.g., "0") used for an "off current," in one embodiment (the "off" current does not mean that the laser is unpowered, and instead refers to generating an optical signal that represents a logical zero value). Alternatively, the logical "0" may be used for the "on current" with the logical "1" used for the "off current." The modulation signal is applied to a drive circuit, which controls the drive current that flows through a semiconductor laser, in one embodiment. The DML 202 outputs a modulated optical signal in response to the modulation signal, in one embodiment.

The modulation symbol rate may also be referred to as a symbol rate or as a baud rate. The modulation symbol rate is about 50 Gigabits per second (Gbps), in one embodiment. A modulation symbol rate of "about 50 Gbps" means that the modulation symbol rate is within 10 percent (plus or minus) of 50 Gbps. The modulation rate is greater than 45 Gbps, in one embodiment. The modulation symbol rate could be less than 45 Gbps. The acceptable tolerance of dispersion decreases as the modulation symbol rate increases. Dispersion of the optical signal in the optical transmission medium 112 could potentially result in high bit error rates in the receiver 126. However, the optical communication system 200 achieves bit error rates that are within a tolerable level, even with a modulation symbol rate of 50 Gbps. In one embodiment, the modulation format is non-return-to-zero (NRZ) on-off-keying (OOK), where an "ON" state of the laser is used to carry a digit "1" and an "OFF" state of the laser is used to carry a digit "0". However, other modulation formats such as pulse amplitude modulation (PAM), may also be used. For example, the modulation format could be 4-ary PAM or PAM-4.

Figure 3:
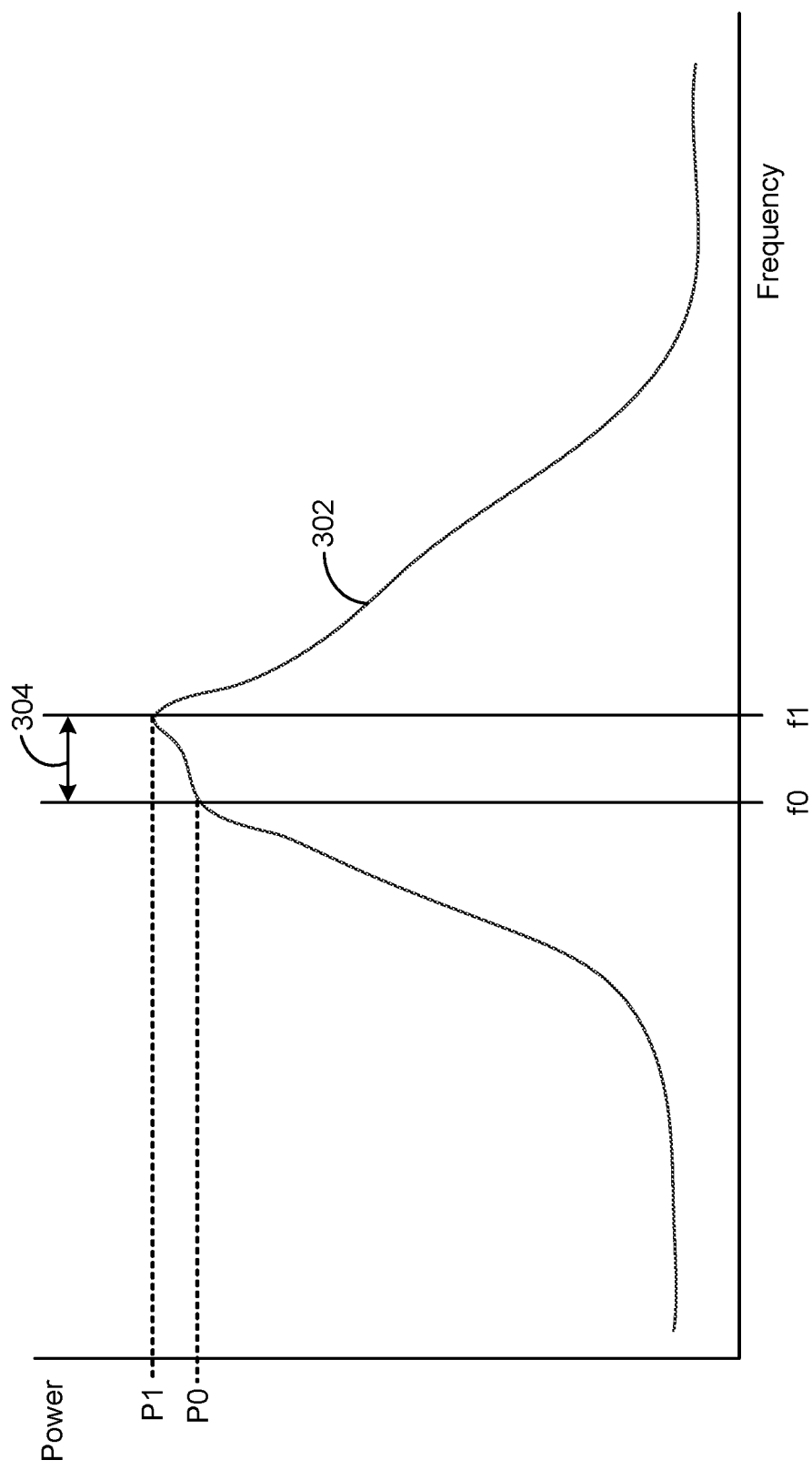
FIG. 3 depicts an example optical spectrum of an optical signal output by a directly modulated laser (DML).

FIG. 3 depicts an example optical spectrum of an optical signal output by the DML 202. The optical spectrum 302 has two peaks in this example. The peak at frequency f0 represents the transmission of logical zero values as indicated in the modulation signal, while the peak at frequency f1 represents the transmission of logical one values. The frequency gap 304 between these two peaks is referred to as an adiabatic chirp 304. The frequency f1 that is associated with transmitting logical ones is blue shifted relative to the frequency f0 that is associated with transmitting logical zeroes. A "blue shift" in this context means that the one bits are transmitted at a shorter wavelength (and higher frequency) relative to the zero bits. The frequency gap 304 has a frequency difference (in hertz) of between 0.3 to 0.5 times the modulation symbol rate (in bits per second), in one embodiment. For example, if the modulation symbol rate is 50 Gbps, and the frequency gap 304 is 0.3 times the modulation symbol rate, then the frequency gap 304 is 15 GHz. As another example, if the modulation symbol rate is 50 Gbps, and the frequency gap 304 is 0.5 times the modulation symbol rate, then the frequency gap 304 is 25 GHz. A shorthand way of expressing this relationship is to say that the modulation symbol rate is "R" and the frequency gap 304 is some fraction of R (e.g., between 0.3R to 0.5R.

As noted above, the extinction ratio of the optical signal is defined as the ratio between the power of the first frequency of the optical signal and the power of the second frequency of the optical signal. Referring to FIG. 3, the power level of the first frequency is P1, and the power level of the second frequency is P0. Thus, the extinction ratio is P1/P0. In one embodiment, the extinction ratio is greater than 3 dB before the optical signal is filtered by the OBPF 204. A high extinction ratio can help to achieve sufficient adiabatic chirp or frequency gap between the first frequency and the second frequency of the optical signal. The OBPF 204 further increases the extinction ratio of the optical signal, in one embodiment.

Returning again to the discussion of FIG. 2, the modulated optical signal from the DML 202 is inputted (e.g., optically coupled) to the OBPF 204. In one embodiment, there is an optical fiber between the output of the DML 202 and the input of the OBPF 204. As one example, the DML 202 may have an output optical waveguide and the OBPF 204 may have an input optical waveguide. These two waveguides may be connected by an optical fiber or other optical transmission medium. In one embodiment, there is an air gap between the output of the DML 202 and the input of the OBPF 204. In one embodiment, the output of the DML 202 is directly connected to the input of the OBPF 204. For example, an output optical waveguide of the DML 202 is directly connected to an input optical waveguide of the OBPF 204, in one embodiment. The cross-section dimensions at an output port of the DML output optical waveguide and an input port of the OBPF input optical waveguide are matched with each other, in one embodiment. Note that one or both of the optical waveguides may be tapered. Hence, the cross-section dimensions are not necessarily the same at all points along the optical waveguides.

The OBPF 204 is a relatively narrow bandpass filter, in one embodiment. The OBPF 204 has a 3-dB bandwidth (in Hertz) of less than the modulation symbol rate (R in bits per seconds), in one embodiment. The OBPF 204 has a 3-dB bandwidth of approximately half of the modulation symbol rate (R/2), in one embodiment. By "approximately half of modulation symbol rate" it is meant between 40 percent and 60 percent of the modulation symbol rate. The 3-dB bandwidth is between half the modulation symbol rate (R/2) and the modulation symbol rate (R), in one embodiment. The bandwidth narrowness of the OBPF 204 could result in causing a bandwidth limitation, such as inter-symbol interference, in the optical signal outputted by the transmitter 104. The equalizer 208 is used to compensate for the bandwidth limitation caused by the narrowness of the OBPF 204, in one embodiment. The equalizer 208 is used to compensate for inter-symbol interference caused by the narrowness of the OBPF 204, in one embodiment.

Figure 4:
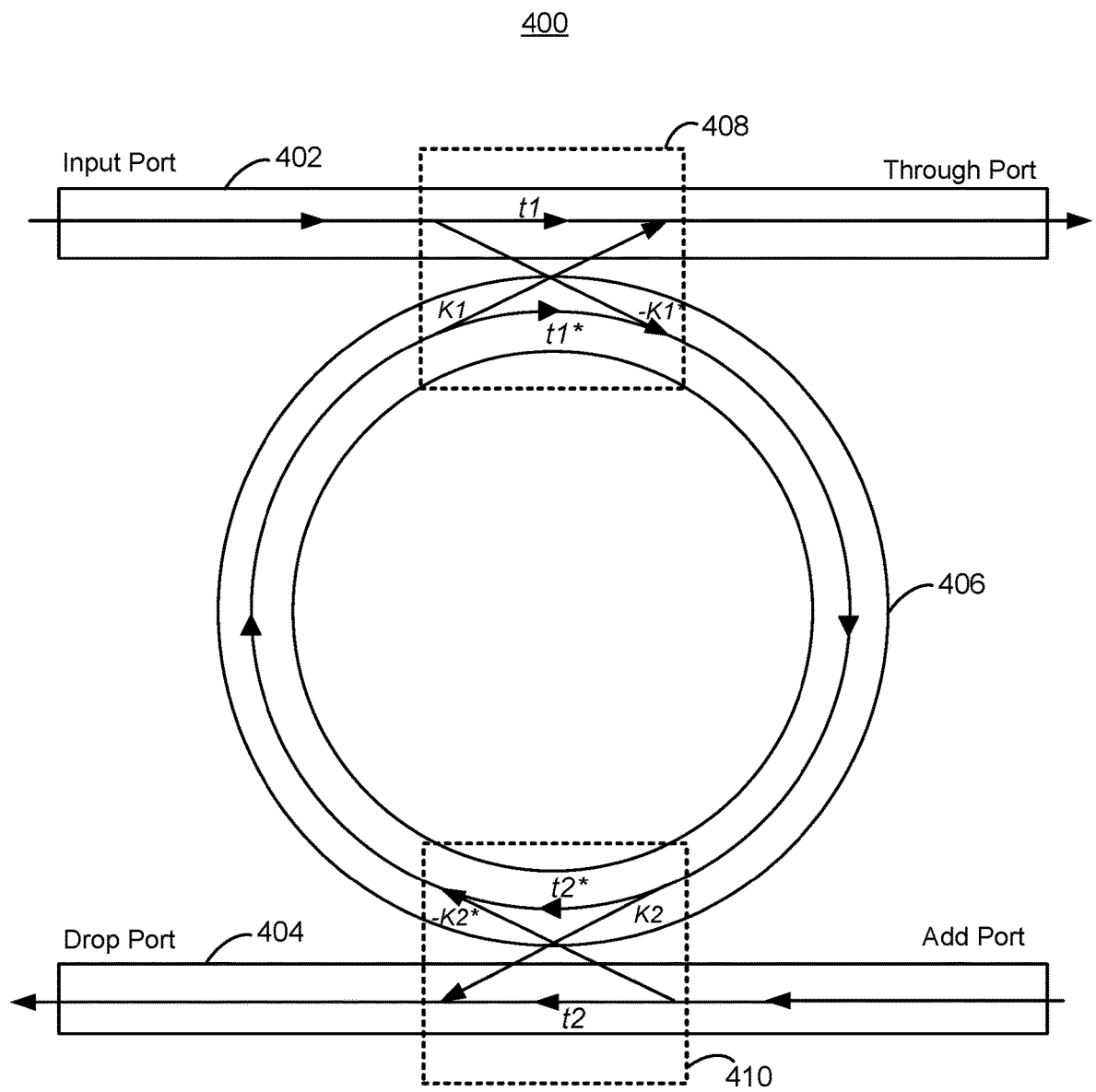
FIG. 4 is a diagram of an optical resonator ring structure in one embodiment of an optical band pass filter (OBPF).

The OBPF 204 comprises a micro-ring resonator (MRR), in one embodiment. The OBPF 204 comprises a single-ring MRR in one embodiment. One embodiment of a single-ring MRR has a free spectral range (FSR) of about 200 GHz. An FSR in a single-ring MRR of "about 200 GHz" means to be anywhere from 180 GHz to 220 GHz. However, the FSR of the single-ring MRR could be less than 180 GHz or greater than 220 GHz, in other embodiments. The OBPF 204 comprises a multi-ring MRR in one embodiment. One embodiment of a multi-ring MRR has a free spectral range (FSR) of about 100 GHz. An FSR in a multi-ring MRR of "about 100 GHz" means to be anywhere from 90 GHz to 110 GHz. However, the FSR of the multi-ring MRR could be less than 90 GHz or greater than 110 GHz, in other embodiments. FIG. 4 discussed below provides further details of one embodiment of the OBPF 204, in which the OBPF 204 is a single-ring MRR.

Referring again to FIG. 2, the tap 210 is used to capture a portion of the optical signal that is output from the OBPF 204, such that the power level of the optical signal may be measured. The photodetector (PD) 212 is used to measure the power of the optical signal, in one embodiment. As one example, the tap 210 could divert 5 percent of the power of the optical signal to the photodetector 212. The tap 210 is not required to divert any of the power of the optical signal to the photodetector 212 if the power of the optical signal is not presently being measured. The photodetector 212 generates an electrical current having a magnitude that is proportional to the power of the optical signal, in one embodiment. The photodetector 212 comprises an avalanche photodetector, in one embodiment. The photodetector 212 comprises a photodiode, in one embodiment. The photodetector 212 is connected to the controller 220 in order to provide the electrical current to the controller 220. The controller 220 may control the DML 202 and/or the OBPF 204 based on the magnitude of the electrical current, in one embodiment. Since the magnitude of the electrical current is proportional to the power of the optical signal, this means that the controller 220 is controlling the DML 202 and/or the OBPF based on the power level of the optical signal, even if the controller 220 does not determine a power level of the optical signal in, for example, decibels. Optionally, the controller 220 may determine the power of the optical signal (in, for example, dB) based on the magnitude of the electrical current.

In one embodiment, the controller 220 establishes a target frequency gap or adiabatic chirp based on the laser drive currents for "ones" and "zeroes" in the modulation signal. For example, the controller 220 adjusts the output of the DML 202 to establish a target frequency gap, in one embodiment. Controlling the drive currents of the DML 202 based on the measurements of the power of the optical signal after the OBPF 204 is a cost effective and accurate technique for establishing the frequency gap.

In one embodiment, the controller 220 locks the OBPF 204 with the DML 202 based on the power of the filtered optical signal output from the OBPF 204. By this it is meant that the controller 220 achieves a target alignment of the spectral content of the optical signal with the transfer function of the OBPF 204. In one embodiment, the controller 220 tunes the OBPF 204 to maximize the power of the filtered optical signal output from the OBPF 204 in order to lock the OBPF 204 with the DML 202. The controller 220 also aligns the frequency gap relative to the transfer function of the OBPF 204, in one embodiment. The controller 220 aligns the first frequency and the second frequency relative to the transfer function of the OBPF 204, in one embodiment. Tapping the power of the optical signal provides a very simple and efficient way to lock the OBPF 204 with the DML 202.

The controller 220 may be implemented using hardware, software, or a combination of both hardware and software. For example, controller 220 may be implemented with a Field-programmable Gate Array (FPGA), Application-specific Integrated Circuit (ASIC), Application-specific Standard Product (ASSP), System-on-a-chip system (SOC), Complex Programmable Logic Device (CPLD), special purpose computer, etc. In one embodiment, software (stored on a storage device) is used to program one or more processors to implement functions performed by the controller 220.

The filtered optical signal (output by the OBPF 204) is optically coupled from the transmitter 104 to the optical fiber 112. FIG. 2 shows a relatively simple configuration for the optical transmission medium 112 comprising an optical fiber 112. There may be an optical fiber network between the transmitter 104 and receiver 126. There could be an ODN 106 between the transmitter 104 and receiver 126. In one embodiment, the filtered optical signal is optically coupled to feed fiber 112a in an ODN 106. The receiver 126 is optically coupled to the optical fiber 112 to receive the filtered optical signal. In one embodiment, receiver 126 is optically coupled to drop fiber 112c in an ODN 106 to receive the filtered optical signal.

The receiver 126 includes an equalizer 208. The equalizer 208 is used to compensate for a bandwidth limitation introduced in the filtered optical signal by the OBPF 204. For example, the narrowness of the OBPF 204 may introduce inter-symbol interference in the optical signal. In one embodiment, the equalizer 208 is configured to compensate for a bandwidth limitation (e.g., inter-symbol interference) introduced in the optical signal by the OBPF 204. The receiver 126 may include other elements such as of a photo-detector and a trans-impedance amplifier. The photo-detector may be used to detect the optical signal and generate a corresponding electrical signal. The trans-impedance amplifier may be used to amplify the optical or electrical signal, and to provide the amplified signal to the equalizer 208.

The equalizer 208 may be implemented in the analog or digital domain. The receiver 126 includes an analog-to-digital converter configured to convert the electrical signal from analog to digital in order for the equalizer 208 to process the electrical signal in the digital domain, in one embodiment. In one embodiment, the equalizer 208 comprises a multi-tap feed-forward equalizer (FFE).

FIG. 4 is a diagram of an optical resonator ring structure 400 in one embodiment of the OBPF 204. The optical resonator ring structure 400 includes a first optical waveguide 402, a second optical waveguide 404, and an optical resonator ring 406. The first optical waveguide 402 is optically coupled to the optical resonator ring 406 in a first coupling region 408. The second optical waveguide 404 is optically coupled to the optical resonator ring 406 in a second coupling region 410. The first optical waveguide 402 has an optical input "Input Port" and an optical output "Through Port". The second optical waveguide 410 has an optical input "Add Port" and an optical output "Drop Port". There are several arrows within the first optical waveguide 402, second optical waveguide 404, and optical resonator ring 406 to show the direction of light propagation, assuming that light enters at both the Input Port and the Add Port. It is not required that both the Input Port and Add Port are used to admit light. In one embodiment, the optical signal from the DML 202 is optically coupled into the Input Port of the first optical waveguide 402. In one embodiment, the filtered optical signal is optically coupled out of the Drop Port of the second optical waveguide 404.

In operation, when light passes through the first optical waveguide 402, some of the light will be coupled to the optical resonator ring 406 if the ring and the first optical waveguide 402 are close enough. As shown in FIG. 4, some of the light in the first optical waveguide 402 will be optically coupled into the optical resonator ring 406 in the first coupling region 408. Likewise, when light passes through the second optical waveguide 404, some of the light will be optically coupled to the optical resonator ring 406 if the ring and the second optical waveguide 404 are close enough. As shown in FIG. 4, some of the light in the second optical waveguide 404 will be optically coupled into the optical resonator ring 406 in the second coupling region 410. As noted above, it is not required that the Add Port be used, in which case, it is not required that light couple from the second optical waveguide 404 to the optical resonator ring 406.

Light that is coupled into the optical resonator ring 406 circulates within the optical resonator ring 406. Arrows within the optical resonator ring 406 depict the direction of light circulation, assuming that light enters the first optical waveguide 402 at the Input Port and/or light enters the second optical waveguide 404 at the Add Port. Furthermore, some of the light that is circulating in the optical resonator ring 406 may optically couple to a waveguide. Thus, some of the light that is circulating in the optical resonator ring 406 may optically couple to the first optical waveguide 402 in the first coupling region 408. This light propagates to the optical Through Port. Likewise, some of the light that is circulating in the optical resonator ring 406 may optically couple to the second optical waveguide 404 at the second coupling region 410. This light propagates to the optical Drop Port.

The filtering properties of the optical resonator ring structure 400 shown in FIG. 4 may be determined by ring properties such as length, loss, transmission coefficients, and coupling efficiencies in the optical coupling regions 408 and 410. FIG. 4 labels some transmission coefficients (t1, t1*, t2, t2*). FIG. 4 also labels some taper-sphere mode coupling amplitudes (K1, −K1*, K2, −K2*), which may also be referred to as coupling coefficients.

Transmission coefficient t1 refers to light that passes from the Input Port to the Through Port of the first optical waveguide 402. Transmission coefficient t1* refers to the light that remains circulating in the optical resonator ring 406 rather than coupling to the first optical waveguide 402. Transmission coefficient t2 refers to the light that passes from the Add Port to the Drop Port of the second optical waveguide 404. Transmission coefficient t2* refers to the light that remains circulating in the optical resonator ring 406 rather than coupling to the second optical waveguide 404.

Coupling amplitude K1 pertains to light coupled from the optical resonator ring 406 to the first optical waveguide 402. Coupling amplitude −K1* pertains to light coupled from the first optical waveguide 402 to the optical resonator ring 406. Coupling amplitude K2 pertains to light coupled from the optical resonator ring 406 to the second optical waveguide 404. Coupling amplitude −K2* pertains to light coupled from the second optical waveguide 404 to the optical resonator ring 406.

In one embodiment, optical resonator ring 406 is made from silicon nitride (SiN). In one embodiment, the waveguides 402, 404 are made from silicon nitride (SiN). The Input Port of the first waveguide 402 is optically coupled to the output of the DML 202, in one embodiment. The first waveguide 402 has cross-section dimensions at the Input Port matched with cross-section dimensions of an output port of a waveguide in the DML 202, in one embodiment.

Figure 5:
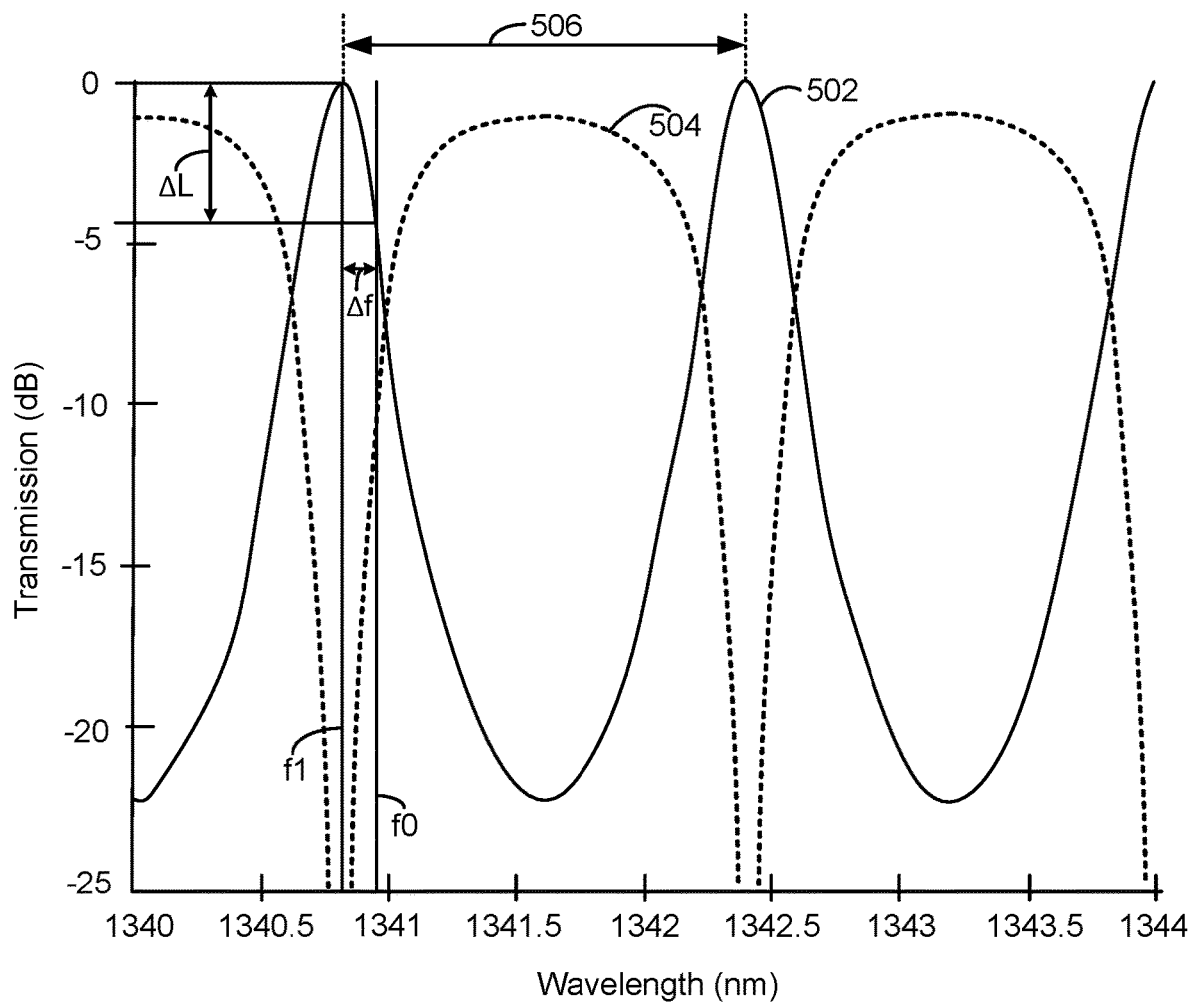
FIG. 5 depicts a transfer function of an embodiment of an OBPF.

Note that during operation, certain wavelengths of an optical signal that is input to the Input Port of the first optical waveguide 402 may pass to the Through Port of the first optical waveguide 402, whereas other wavelengths of the optical signal that is input to the Input Port of the first optical waveguide 402 may pass to the Drop Port of the second optical waveguide 404. FIG. 5 is a diagram to illustrate transfer functions of the optical resonator ring structure 400 to illustrate the foregoing.

FIG. 5 depicts a transfer function of an embodiment of an OBPF. FIG. 5 depicts a transfer function 502 from the Input Port to the Drop Port, as well as the transfer function 504 from the Input Port to the Through Port. The transfer functions may also be referred to as transmission curves. Transfer function 502 depicts the power of the optical signal after it is input to the Input Port of the first optical waveguide 402 and is then passed to the Drop Port of the second optical waveguide 404 as a function of frequency, where the power is normalized to the peak power at the maximum transmittance. Transfer function 504 depicts the power of the optical signal after it is input to the Input Port of the first optical waveguide 402 and is then passed to the Through Port of the first optical waveguide 402, as a function of frequency, where the power is normalized to the peak power at the maximum transmittance. Thus, by providing the optical signal from the DML 202 to the Input Port of the first optical waveguide 402, a filtered optical signal may be obtained from the Drop Port of the second optical waveguide 404, in one embodiment. The transfer functions 502, 504 may also be referred to as transmission curves.

FIG. 5 also illustrates a center of the first frequency f1 and a center of the second frequency f0. Note that the x-axis is in units of wavelengths. Hence, due to the inverse relationship between wavelength and frequency, f0 is to the right of f1 in FIG. 5. The locations of f1 and f0 are used to illustrate what is meant by a target frequency gap Δf and a target loss difference ΔL.

FIG. 5 depicts one possible alignment of the center of the first frequency f1 of the optical signal with respect to the transfer function 502. Also depicted is one possible alignment of the center of the second frequency f0 of the optical signal with respect to the transfer function 502. In this example, the center of the first frequency f1 is approximately at a peak transmission frequency of transfer function 502. However, the center of the first frequency f1 is not required to be at the peak transmission frequency of transfer function 502.

FIG. 5 also shows a target frequency gap Δf between the center of the first frequency f1 and the center of the second frequency f0. FIG. 5 also shows a target loss difference ΔL. The target loss difference ΔL is defined based on where the center of first frequency f1 and the center of second frequency f0 intersect the transfer function 502. More specifically, the target loss difference ΔL is defined as the difference in power between those two points on the transfer function 502. Thus, the target loss differ difference ΔL is defined as the difference in power between the peak transmittance of the OBPF and the transmittance of OBPF at a frequency that is away from the peak transmittance frequency by the target frequency gap. In FIG. 5, the target loss difference ΔL is shown to be about −4 dB, but could be greater or smaller.

Transfer function 502 has multiple peak transmission frequencies. For example, peak transmission frequencies are depicted at about 1340.8 nm, 1342.4 nm, and 1344 nm. The distance between these peak transmission frequencies is referred to as the free spectral range (FSR) 506. One embodiment of a single-ring MRR has a free spectral range (FSR) of about 200 GHz. The entire transfer function 502 of the OBPF 204 may be shifted up or down in wavelength, in one embodiment. Thus, the wavelengths of the peak transmission frequencies may be shifted up or down, in one embodiment. Shifting the wavelength of the peak transmission frequencies does not have a significant impact on the FSR 506, in one embodiment.

In operation, the optical signal may be aligned with the portion of the transfer function 502 that corresponds to one of the peak transmission frequencies. With reference to the optical spectrum 302 in FIG. 3, when the transmitter 104 is being used to transmit information in an optical signal to the receiver 126, the frequency f1 may be aligned roughly to one of the peak transmission frequencies. It is not required that frequency f1 be aligned exactly with a peak transmission frequency. The second frequency f0 is aligned to a point on the transfer function 502 that is at least 3 dB below the peak transmission frequency to which the first frequency f1 is roughly aligned, in one embodiment. By the first frequency f1 being roughly aligned with a peak transmission frequency it is meant that the spectral content at the first frequency f1 is attenuated less than the spectral content at the second frequency f0. This alignment increases the extinction ratio of the optical signal, in one embodiment. The frequency f1 and the frequency f0 are on the opposite sides of the transmission curve/transfer function with respect to the peak transmission frequency, in one embodiment.

In one embodiment, the alignment of the optical signal to the transmission curve (e.g., transfer function 502) is achieved based on the power level of the optical signal at the output of the OBPF 204. In one embodiment, the alignment of the optical signal to the transmission curve (e.g., transfer function 502) is achieved by maximizing the power of the optical signal at the output of the OBPF 204. Aligning the optical signal to the transmission curve is one technique to lock the OBPF 204 with the DML 202.

Figure 6:
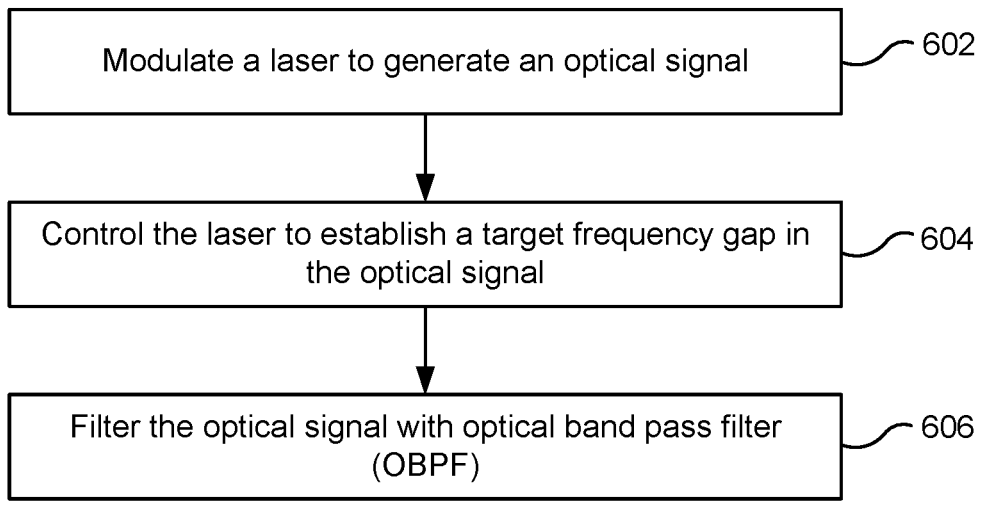
FIG. 6 is a flowchart of one embodiment of an optical communication process.
Figure 7:
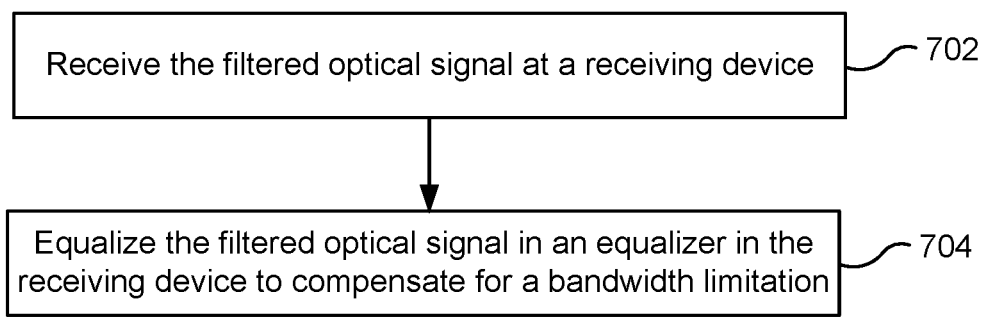
FIG. 7 is a flowchart of another embodiment of an optical communication process.

FIG. 6 is a flowchart of one embodiment of an optical communication process 600. Process 600 is implemented in transmitter 104, in one embodiment. Process 600 is implemented in optical communication system 200, in one embodiment. The process 600 is implemented in the PON 100, in one embodiment. However, it is not required that the process 600 be implemented in a PON. In one embodiment, process 600 is implemented in an active optical network (AON). Prior to performing process 600, parameters for operating the DML 202 and/or OBPF 204 may be learned. These parameters may be used to establish a target frequency gap. In one embodiment, these parameters include a first DML drive current for generating first (optical) frequencies representing logical one values, and a second DML drive current for generating second (optical) frequencies representing logical zero values.

Step 602 includes modulating a laser to generate an optical signal. The DML 202 comprises a semiconductor laser, in one embodiment. In one embodiment, the DML 202 is modulated using a modulation signal wherein a first voltage level of the modulation signal represents logical one values and a second voltage level represents logical zero values. The generated optical signal comprises a mixture of first frequencies and second frequencies, in one embodiment. The optical signal has a modulation symbol rate of "R." The optical signal has a frequency gap between 0.3 R and 0.5 R, in one embodiment.

Figure 9:
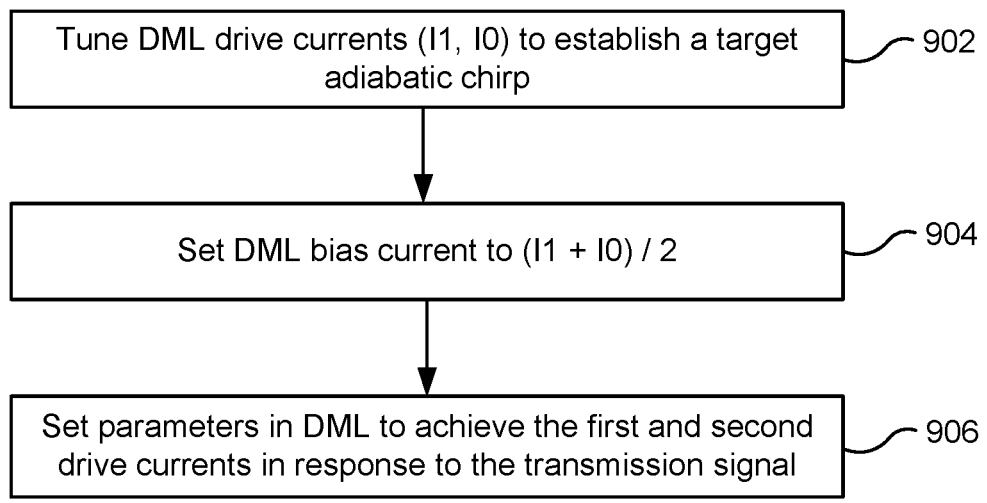
FIG. 9 is a flowchart of an embodiment of a process of establishing parameters for operating a DML.
Figure 10:
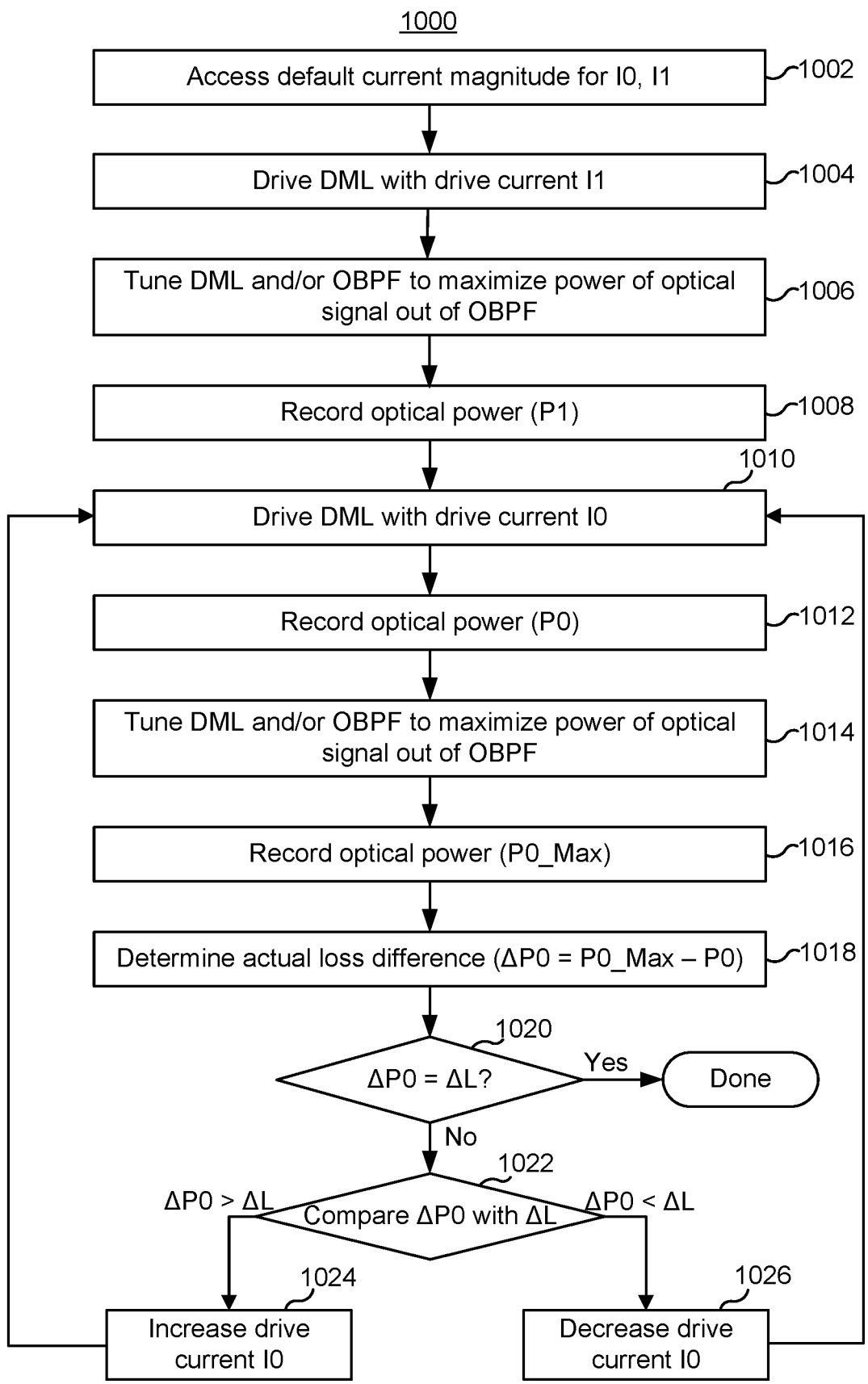
FIG. 10 is a flowchart of an embodiment of a process of establishing a target frequency gap.

Step 604 includes controlling the laser to establish a target frequency gap between the first frequency and the second frequency of the optical signal. In one embodiment, step 604 comprises establishing a target frequency for a frequency gap. With reference to FIG. 3, a target frequency for the frequency gap 304 is established in one embodiment. FIGS. 9 and 10, discussed below, depict embodiments for establishing a target frequency for a frequency gap.

Step 606 includes filtering the optical signal with an OBPF 204. The OBPF 204 has a 3-dB bandwidth of less than R, in one embodiment. The OBPF 204 has a 3-dB bandwidth of about R/2, in one embodiment. In one embodiment, the OBPF 204 comprises a micro-ring resonator (MRR). In one embodiment, the OBPF 204 comprises a single-ring micro-ring resonator (MRR). The optical signal is optically coupled in to an Input Port of a first waveguide 402 of a single-ring MRR 400, in one embodiment.

In one embodiment, the OBPF 204 is tuned for maximum power of the optical signal output from the OBPF. For example, the peak transmission frequency of the OBPF 204 may be shifted until the optical signal output from the OBPF 204 is at maximum power. Step 604 may include tapping the optical signal at the output of the OBPF 204. For example, tap 210 may be used to divert a portion of the optical signal to a photodetector 212. The photodetector 212 may be used to generate an electrical current having a magnitude proportional to the power level of the diverted portion of the optical signal. The electrical current may be provided to the controller 220. Based on the magnitude of the electrical current, the controller 220 may adjust the peak transmission frequency of the OBPF 204 in order to maximize power of the optical signal at the output of the OBPF 204. Step 606 is used to lock the laser with the OBPF based on the power of the optical signal output from the OBPF, in one embodiment.

After step 606, the filtered optical signal from the OBPF 204 may be coupled into an optical transmission medium, such as a fiber optic network. The fiber optic network is an ODN 106, in one embodiment. The filtered optical signal is optically coupled out of a Drop Port of a second waveguide 404 of a single-ring MRR 400, in one embodiment. In one embodiment, the filtered optical signal is optically coupled to a feed optical fiber 112*a* in an ODN 106.

Process 700 is a flowchart of another embodiment of an optical communication process. Process 700 is performed in receiver 126, in one embodiment. Process 700 may be used to equalize the filtered optical signal that the OBPF 204 outputs in process 600.

Step 702 includes receiving the filtered optical signal at a receiving device. The filtered optical signal is received via an optical communication network, in one embodiment. The receiving device has an equalizer 208. The receiving device is receiver 126, in one embodiment. The receiver 126 is at an end of a fiber optic network, in one embodiment. The equalizer 208 is in an ONU/ONT 110 in a PON 100, in one embodiment.

Step 704 includes equalizing the filtered optical signal to compensate for a bandwidth limitation. The bandwidth limitation is caused by the OBPF 204, in one embodiment. More particularity, the bandwidth limitation may be caused by the bandwidth narrowness of the OBPF 204 relative to the spectral content of the optical signal. In one embodiment, step 704 includes equalizing the filtered optical signal to compensate for inter-symbol interference in the optical signal caused by the OBPF 204.

Figure 8:
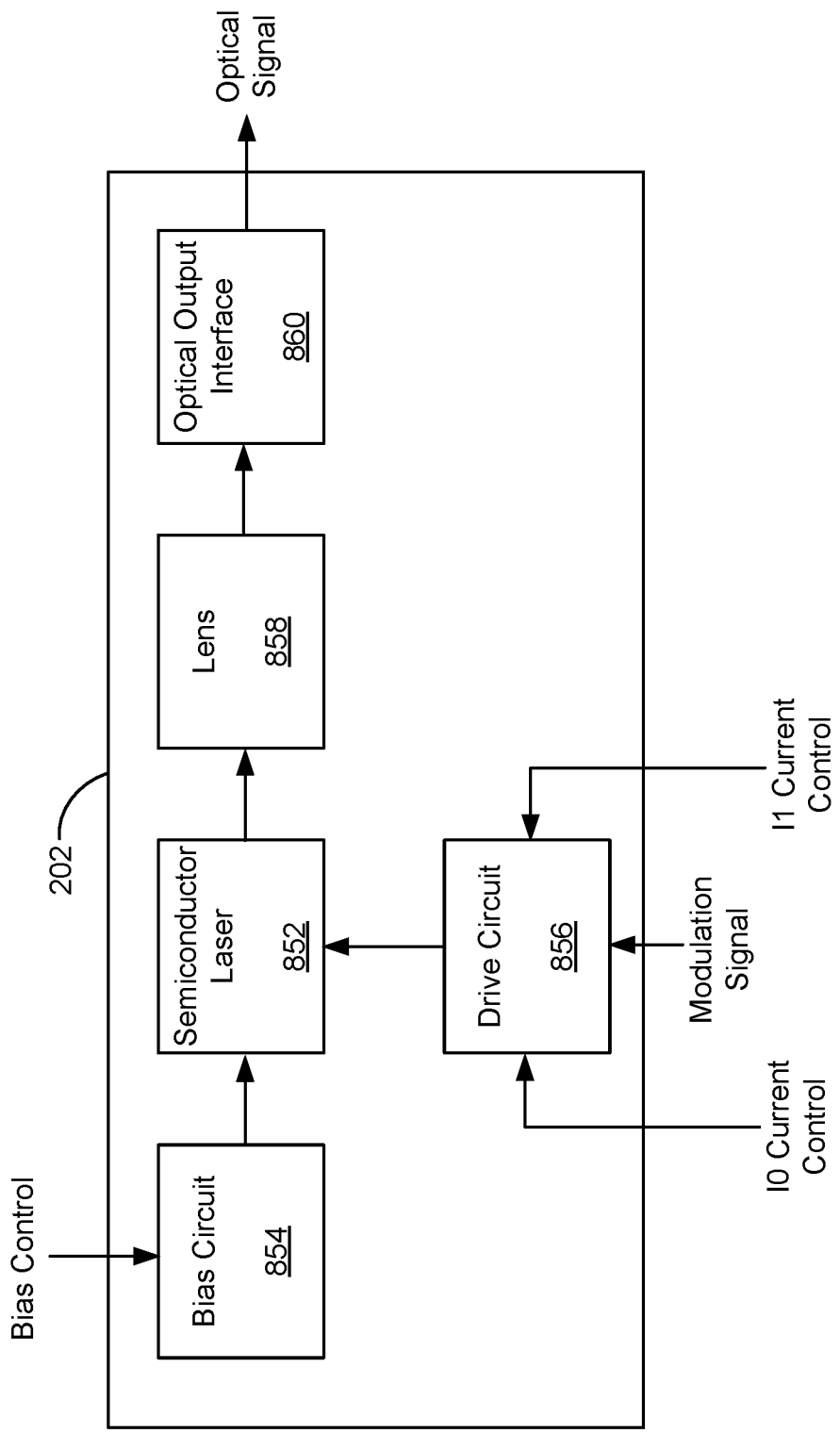
FIG. 8 is a diagram of an embodiment of a DML.

FIG. 8 is a diagram of an embodiment of a DML 202. The DML 202 has a semiconductor laser 852, bias circuit 854, drive circuit 856, lens 858, and optical output interface 860.

The bias circuit 854 is configured to provide a bias current to the semiconductor laser 852. The magnitude of the bias current may be controlled by a bias control signal. The bias control signal may be an analog or digital signal. As one example, the bias control signal is a voltage, wherein a voltage magnitude of the bias control signal establishes the magnitude of the bias current. In one embodiment, the controller 220 furnishes the bias control signal, making the bias circuit 854 unnecessary. The bias circuit 854 may comprise electronic components including, but not limited to, transistors, resistors, etc.

The drive circuit 856 is configured to provide a drive current to the semiconductor laser 852. In one embodiment, the drive circuit 856 controls a current source that is in series with the semiconductor laser 852. The magnitude of the drive current depends, at least in part, on the modulation signal. In one embodiment, the drive current has a first magnitude in response to the modulation signal having a voltage level of logical one and a second magnitude in response to the modulation signal having a voltage level of logical zero. Herein, when the drive current has the first magnitude, the drive current may be referred to as a "first drive current." Herein, when the drive current has the second magnitude, the drive current may be referred to as a "second drive current." In one embodiment, the first drive current is used to transmit logical ones in the modulation signal. Hence, the first drive current may be referred to as I1. In one embodiment, the second drive current is used to transmit logical zeroes in the modulation signal. Hence, the first drive current may be referred to as I0. The drive circuit 856 may comprise electronic components including, but not limited to, transistors, resistors, etc.

In one embodiment, both the first magnitude and the second magnitude of the drive current can be adjusted. In other words, both the first drive current and the second drive current can be adjusted, in one embodiment. The I0 control signal is used to adjust the magnitude of the drive current in response to a logical one in the modulation signal, in one embodiment. The I1 control signal is used to adjust the magnitude of the drive current in response to a logical zero in the modulation signal, in one embodiment. The I0 and I1 control signals may be analog or digital signals. As one example, the I0 and I1 control signals are voltages, whose magnitude establish the magnitude of the I0 and I1 currents. In one embodiment, the controller 220 furnishes the I0 and I1 control signals.

The semiconductor laser 852 emits laser light in response to the bias current and drive current. The lens 858 converges the laser light into the optical output interface 860. The optical output interface 860 may comprise an optical waveguide, an optical fiber, etc. The optical signal is provided by the optical output interface 860. The optical output interface 860 is directly connected to the input of the OBPF 204, in one embodiment. For example, the optical output interface 860 has an optical waveguide with cross-section dimensions that match the cross-section dimensions of an input port of an optical waveguide of the OBPF 204, in one embodiment. In one embodiment, an optical transmission fiber connects the optical output interface 860 to an input of the OBPF 204. In one embodiment, there is an air gap between the optical output interface 860 and an input of the OBPF 204.

FIG. 9 is a flowchart of an embodiment of a process 900 of establishing parameters for operating a DML 202. Process 900 may be performed prior to process 600. The process 900 can be used to determine a bias current, a first drive current I1, and a second drive current I0 for the DML 202 of FIG. 8. However, process 900 is not limited to establishing parameters for operating the DML of FIG. 8, as a different DML could be used. The process 900 is implemented in a PON, such as PON 100, in one embodiment. However, it is not required that the process 900 be implemented in a PON. In one embodiment, process 900 is implemented in an active optical network (AON). Process 900 is implemented in optical communication system 200, in one embodiment.

Figure 11:
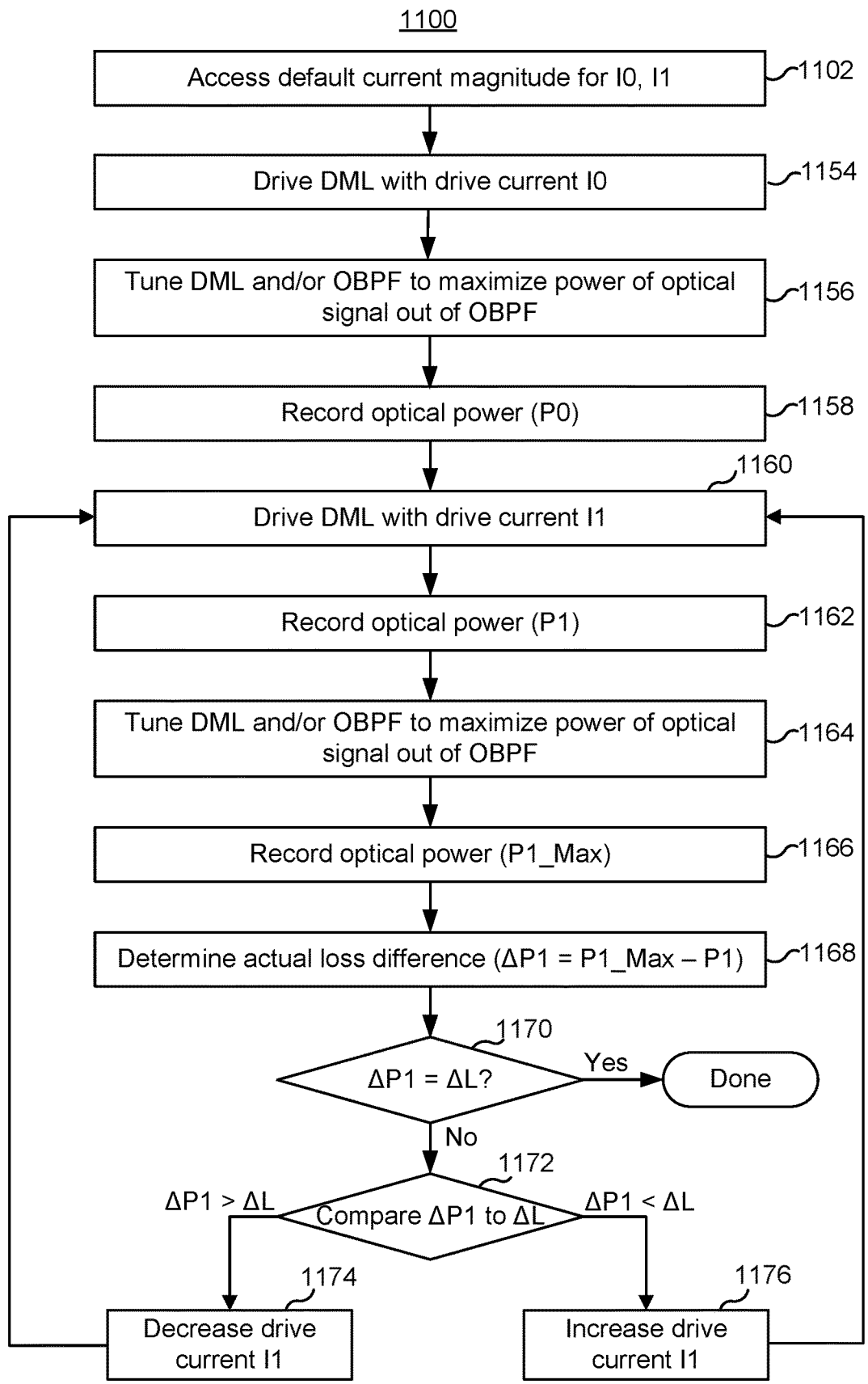
FIG. 11 is a flowchart of another embodiment of a process of establishing a target frequency gap.

Step 902 includes tuning the DML 202 drive currents (e.g., I0, I1) to establish a target frequency gap. As noted herein, a first drive current I0 may be used in the DML 202 to transmit logical ones, and a second drive current I0 may be used to transmit logical zeroes, in one embodiment. Step 902 may include establishing a target frequency for the adiabatic chirp. Step 902 may also include tuning the DML and/or OBPF such that the first frequency and the second frequency of the optical signal are aligned relative to the transfer function of the OBPF to meet a target extinction ratio. FIGS. 10 and 11 provide further details of embodiments for tuning the DML 202 drive currents to establish a target frequency gap.

Step 904 includes setting a bias current of the DML 202 based on the first drive current I1 and the second drive current I0. In one embodiment, the bias current of the DML 202 is set to the mathematical mean of the first drive current I1 and the second drive current I0. In one embodiment, the controller 220 applies the bias control signal to the bias circuit 854 in order to set the bias current of the DML 202.

Step 906 includes setting parameters in the DML 202 to achieve the first drive current I1 and the second drive current I0 in response to the modulation signal. In one embodiment, the controller 220 applies the I0 Control Signal and the I1 Control Signal to the drive circuit 856 in step 906. Thus, as a result of step 906, the first drive current I1 will have a target magnitude in response to logical ones in the modulation signal. Likewise, the second drive current I0 will have a target magnitude in response to logical zeroes in the modulation signal.

FIG. 10 is a flowchart of an embodiment of a process 1000 for establishing a target frequency gap. Process 1000 establishes a target frequency for the frequency gap. Process 1000 may also establish a target extinction ratio for the optical signal. Process 1000 learns a first drive current I1 and a second drive current I0. These drive currents may be used in process 600. The process 1000 may be used in one embodiment of step 902 of process 900.

Step 1002 includes accessing default current magnitudes for DML drive currents I0 and I1. In one embodiment, the default magnitude for drive current I1 is greater than the default magnitude for drive current I0. If the drive current of the DML 202 is too high, then a semiconductor laser 852 in the DML 202 may be damaged. Thus, the DML 202 has maximum allowed current Imax, in one embodiment. The maximum allowed current will depend on the DML, but an example maximum allowed current is 120 mA. The default magnitudes of DML drive currents I0 and I1 should be below the maximum allowed current. An example of a default magnitude of DML drive current I1 is 100 mA. An example of a default magnitude of DML drive current I0 is 20 mA.

In process 1000, the magnitude of drive current I0 is adjusted to establish the target frequency gap. The default magnitude for drive current I1 is sufficiently high to allow the extinction ratio of the optical signal before it is filtered by the OBPF 204 to be larger than a target extinction ratio (e.g., 3 dB), in one embodiment. Note that process 1000 concludes when an actual loss difference (APO) equals a target loss difference (ΔL) given the transfer function of the OBPF 204. The default magnitude for drive current I1 is sufficiently high to allow the actual loss difference (APO) to eventually equal the target loss (ΔL), in one embodiment. However, in the event that the default magnitude for current I1 is too high or low to meet either criterion, then the magnitude for drive current I1 can be decreased or increased with process 1000 then repeated. Step 1002 may include the controller 220 applying the I0 Control Signal and the IO control signal to the drive circuit 856 in order to set the default magnitudes for the drive currents I0 and I1.

Step 1004 includes driving the DML 202 with the first drive current I1. This may include providing a modulation signal to the drive circuit 856 such that the drive circuit 856 will provide the first drive current I1 to the semiconductor laser 852. As one example, the modulation signal may be at a voltage level that corresponds to logical ones.

Step 1006 includes tuning the DML 202 and/or the OBPF 204 to maximize power of the optical signal at the output of the OBPF 204. A goal of one embodiment of step 1006 is to place the frequency f1 of the ones in the optical signal at the peak transmission frequency of the OBPF 204. With reference to FIG. 2, the optical signal may be tapped at tap 210, with at least some of the optical signal being diverted to the photodetector (PD) 212. The photodetector 212 measures the power of the optical signal and provides a reading (e.g., a representative electrical current) of the power to the controller 220. As noted above, the photodetector 212 may generate an electrical current having a magnitude proportional to the power of the optical signal. The controller 220 sends one or more control signals to the DML 202 and/or the OBPF 204 to alter operating conditions. The controller 220 determines whether the power of the optical signal goes up or down in response to changing the operation conditions of the DML 202 and/or the OBPF 204. The controller 220 continues to adjust the operating conditions of the DML 202 and/or the OBPF 204 until the power of the optical signal is at a maximum.

In one embodiment, the controller 220 adjusts the peak transmission frequency of the OBPF 204 until the power of the optical signal is at a maximum. The first drive current (I1) may be kept constant during this adjustment of the peak transmission frequency of the OBPF 204 until the power of the optical signal is at a maximum. The frequency f1 of the ones in the optical signal may depend on the temperature of the semiconductor laser 852. Hence, adjustments to the temperature of the semiconductor laser 852 may change the location of the frequency f1 relative to the peak transmission frequency of the OBPF 204. Hence, in one embodiment, the controller 220 adjusts the temperature of the semiconductor laser 852 until the power of the optical signal is at a maximum. The peak transmission frequency of the OBPF 204 may be kept constant while the temperature of the semiconductor laser 852 is adjusted until the power of the optical signal is at a maximum. It is also possible adjust both the temperature of the semiconductor laser 852 and the peak transmission frequency of the OBPF 204 until the power of the optical signal is at a maximum.

Step 1008 includes recording the optical power (P1) that results from step 1006. In one embodiment, the controller 220 has access to a register in which to store a value that represents the optical power (P1). The optical power (P1) may be used to calculate an extinction ratio P1/P0 at the end of the process 1000. The power (P1) is recorded in dB, in one embodiment.

Step 1010 includes driving the DML 202 with the second drive current I0. As noted above, the controller 220 may have previously provided an I0 Control signal to the drive circuit 856 to establish the default value for the second drive current I0. Step 1010 may include providing a modulation signal to the drive circuit 856 such that the drive circuit 856 will provide the second drive current I0 to the semiconductor laser 852. As one example, the modulation signal may be at a voltage level that corresponds to logical zeroes. Note that step 1010 may result in the frequency f0 being aligned to a point on the transmission curve that is several dB below the peak transmission frequency of the OBPF 204. Thus, the content of the optical signal at frequency f0 may be attenuated to a greater extent by the OBPF 204 than the content at frequency f1. In one embodiment, the frequency f0 may be aligned near an edge of the OBPF 204.

Step 1012 includes recording a power (P0) of the optical signal at the output of the OBPF 204. Step 1012 may include the tap 210 diverting a portion of the optical signal to the photodetector 212, which provides a power measurement to the controller 220. The power measurement may be in the form of an electrical current, whose magnitude corresponds to the power level of the optical signal. The controller 220 may store a value that represents the power (P0) into a register. The power (P0) is recorded in dB, in one embodiment.

Step 1014 includes tuning the DML 202 and/or the OBPF to maximize power of the optical signal at the output of the OBPF 204. A goal of one embodiment of step 1014 is to place the frequency f0 of the zeroes in the optical signal at a peak transmission frequency of the OBPF 204. Thus, step 1014 may be similar to step 1006. In one embodiment, a peak transmission frequency of the OBPF is adjusted in step 1014 until the power of the optical signal at the output of the OBPF 204 is at a maximum. In one embodiment, the temperature of the semiconductor laser 852 is adjusted in step 1014 until the power of the optical signal at the output of the OBPF 204 is at a maximum. In one embodiment, the temperature of the semiconductor laser 852 and a peak transmission frequency of the OBPF are both adjusted in step 1014 until the power of the optical signal at the output of the OBPF 204 is at a maximum.

Step 1016 includes recording the optical power (P0_Max) after completion of step 1014. The optical power (P0_Max) refers to the power when the zeroes portion of the optical signal is aligned with a peak transmission frequency of the OBPF 204. In other words, f0 is now aligned with a peak transmission frequency of the OBPF 204. The controller 220 may store a value for the optical power (P0_Max) into a register or the like. The power (P0_Max) is recorded in dB, in one embodiment.

Step 1018 includes determining an actual loss difference. The actual loss difference, in this example, is defined as the difference between the power when the zeroes portion of the optical signal is aligned with the peak transmission frequency of the OBPF 204 and the power when the zeroes portion of the optical signal is aligned near the edge of the OBPF 204. Thus, the actual loss difference (ΔP0) is defined as P0_Max−P0, in this example. The actual loss difference is measured in dB, in one embodiment.

Step 1020 includes comparing the actual loss difference (ΔP0) with a target loss difference (ΔL) given the transfer function (or transmittance curve) of the OBPF 204 and the desired frequency of the frequency gap. For example, if the desired frequency of the frequency gap is 25 GHz, then the target loss difference (ΔL) may be determined based on the relative loss difference between the OBPF 204 peak transmission frequency and the offset frequency (e.g., 25 GHz from the peak transmission frequency). The target loss difference (ΔL) is expressed in dB, in one embodiment. Thus, step 1020 compares two decibel levels, in one embodiment.

The following examples will be used for illustrative purposes. As one example, the modulation symbol rate of the optical signal is 50 Gbps, and the target frequency gap is 0.5 times the modulation symbol rate (or 25 GHz). Under the assumption that the OBPF has a 3 dB bandwidth that is equal to the modulation symbol rate, then the target loss difference (ΔL) would be 3 dB. If the OBPF has a 3 dB bandwidth less than the modulation symbol rate, then the target loss difference (ΔL) would be greater than 3 dB.

If the actual loss difference (ΔP0) is equal to the target loss difference (ΔL), then the process concludes. It is not required that the actual loss difference (ΔP0) be exactly equal to the target loss difference (ΔL) for the process to conclude, as some small difference may be tolerable and even unavoidable. Thus, the actual loss difference (ΔP0) being equal to the target loss difference (ΔL) will be understood to mean that the difference between the actual loss difference (ΔP0) and the target loss difference (ΔL) is less than 5 percent.

If the actual loss difference (ΔP0) is equal to the target loss difference (ΔL), then the process concludes. If the actual loss difference (ΔP0) is not equal to the target loss difference (ΔL), then the process continues at step 1022. Step 1022 compares the actual loss difference (ΔP0) to the target loss difference (ΔL). Step 1022 includes a determination of whether the actual loss difference (ΔP0) is greater than or less than the target loss difference (ΔL). If the actual loss difference (ΔP0) is greater than the target loss difference (ΔL), then the second current I0 is increased at step 1024. If the actual loss difference (ΔP0) is less than the target loss difference (ΔL), then the second current I0 is decreased at step 1026. Then, the process 1000 returns to step 1010 to drive the DML 202 with the second current I0.

Eventually the process 1000 should conclude when the actual loss difference (ΔP0) is equal to the target loss difference (ΔL) (to within some tolerance level). There is a limit as to how low the second current I0 is permitted to go, in one embodiment. Typically, the transmitter 104 can be designed such that during normal operating conditions, process 1000 can conclude with the actual loss difference (ΔP0) being equal to the target loss difference (ΔL). If the actual loss difference (ΔP0) does not become equal to the target loss difference (ΔL) (to within the tolerance level), then the magnitude of the first drive current I1 may be adjusted up or down. The process 1000 may then continue at step 1004. At the end of process 1000, an extinction ratio (P1/P0) may be calculated based the saved P1 in step 1008 and the last value for P0 in step 1012.

FIG. 11 is a flowchart of another embodiment of a process 1100 of establishing a target frequency gap. Process 1100 establishes a target frequency for the frequency gap. Process 1100 may also establish a target extinction ratio for the optical signal. Process 1100 learns a first drive current I1 and a second drive current I0. These drive currents may be used in process 600. The process 1100 may be used in one embodiment of step 902 of process 900. Process 1100 is similar to process 900 but adjusts the first drive current I1 in steps 1174 and/or 1176 (instead of adjusting the second drive current I0 in steps 1024 and/or 1026 of process 1000).

Process 1100 is similar to process 900, but reverses the roles of the first and second drive currents. Hence, process 1100 will not be described in detail. In process 1100, the magnitude of drive current I1 is adjusted to establish the target frequency gap. In step 1102 default magnitudes for the drive current I0 and drive current I1 are accessed. In step 1154, the DML is driven with drive current I0 (as opposed to drive current I1 in step 904).

Step 1156 includes tuning the DML 202 and/or the OBPF 204 to maximize power of the optical signal at the output of the OBPF 204. A goal of one embodiment of step 1156 is to place the frequency f0 of the zeroes in the optical signal at the peak transmission frequency of the OBPF 204.

Step 1158 includes recording the optical power (P0) that results from step 1156. In one embodiment, the controller 220 has access to a register in which to store a value that represents the optical power (P0).

Step 1160 includes driving the DML 202 with the first drive current I1.

Step 1162 includes recording a power (P1) of the optical signal at the output of the OBPF 204.

Step 1164 includes tuning the DML 202 and/or the OBPF to maximize power of the optical signal at the output of the OBPF 204.

Step 1166 includes recording the optical power (P1_Max) after completion of step 1164. The optical power (P1_Max) refers to the power when the zeroes portion of the optical signal is aligned with a peak transmission frequency of the OBPF 204. In other words, f1 is now aligned with a peak transmission frequency of the OBPF 204. The controller 220 may store a value for the optical power (P1_Max) into a register or the like.

Step 1168 includes determining an actual loss difference. The actual loss difference, in this example, is defined as the difference between the power when the ones portion of the optical signal is aligned with the peak transmission frequency of the OBPF 204 and the power when the ones portion of the optical signal is aligned near the edge of the OBPF 204. Thus, the actual loss difference ($\Delta P1$) is defined as P1_Max–P1 in this example.

Step 1170 includes comparing the actual loss difference ($\Delta P1$) with a target loss difference ($\Delta L$) given the transfer function (or transmittance curve) of the OBPF 204 and the desired frequency of the frequency gap. If the actual loss difference ($\Delta P1$) is equal to the target loss difference ($\Delta L$), then the process concludes.

If the actual loss difference ($\Delta P1$) is not equal to the target loss difference ($\Delta L$), then the process continues at step 1172. Step 1172 compares the actual loss difference ($\Delta P1$) to the target loss difference ($\Delta L$). Step 1172 includes a determination of whether the actual loss difference ($\Delta P1$) is greater than or less than the target loss difference ($\Delta L$). If the actual loss difference ($\Delta P1$) is greater than the target loss difference ($\Delta L$), then the first current I1 is decreased at step 1174. If the actual loss difference ($\Delta P1$) is less than the target loss difference ($\Delta L$), then the first current I1 is increased at step 1176. Then, the process 1100 returns to step 1160 to drive the DML 202 with the first drive current I1.

Eventually the process 1100 should conclude when the actual loss difference ($\Delta P$) is equal to the target loss difference ($\Delta L$) (to within some tolerance level). There is a limit as to how high the first current I1 is permitted to go, in one embodiment. Typically, the transmitter 114 can be designed such that during normal operating conditions, process 1100 can conclude with the actual loss difference ($\Delta P1$) being equal to the target loss difference ($\Delta L$). If the actual loss difference ($\Delta P1$) does not become equal to the target loss difference ($\Delta L$) (to within the tolerance level), then the magnitude of the second drive current I0 may be adjusted up or down. The process 1100 may then continue at step 1160. At the end of process 1100, an extinction ratio (P1/P0) may be calculated based the last values saved for P1 in step 1162 and the last value saved for P0 in step 1158.

Process 1000 and 1100 depict alternative techniques for establishing the target frequency gap based on power of the filtered optical signal output from the OBPF 204. In each case, an actual loss difference is compared to the target loss difference $\Delta L$. In process 1000, the actual loss difference is the difference in power of the optical signal with the second frequency aligned to a peak transmission frequency of the OBPF and the power of the optical signal with the second frequency aligned away from the peak transmission frequency of the OBPF 204. In process 1100, the actual loss difference is the difference in power of the optical signal with the first frequency aligned to a peak transmission frequency of the OBPF 204 and the power of the optical signal with the first frequency aligned away from the peak transmission frequency of the OBPF 204. Thus, either the first frequency or the second frequency can be selected to determine the actual loss difference.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An optical transmitter, comprising:
a directly modulated laser (DML) configured to generate a modulated optical signal in response to a modulation signal, the modulated optical signal comprising a first frequency corresponding to a logical one value in the modulation signal and a second frequency corresponding to a logical zero value in the modulation signal, with the modulated optical signal having a modulation symbol rate of "R";
a controller configured to control the DML to establish a target frequency gap between the first frequency and the second frequency; and
an optical band pass filter (OBPF) coupled to the DML to receive the modulated optical signal and output a filtered optical signal, the OBPF having a 3-dB bandwidth of less than R.

2. The optical transmitter of claim 1, wherein:
the controller is further configured to establish the target frequency gap based on power of the filtered optical signal output from the OBPF.

3. The optical transmitter of claim 1, wherein:
the controller is further configured to lock the OBPF with the DML based on power of the filtered optical signal output from the OBPF.

4. The optical transmitter of claim 1, wherein:
the controller is further configured to tune the OBPF to maximize power of the filtered optical signal output from the OBPF to lock the DML with the OBPF.

5. The optical transmitter of claim 1, wherein:
the controller is further configured to adjust a peak transmission frequency of the OBPF to maximize power of the filtered optical signal output from the OBPF to lock the DML with the OBPF.

6. The optical transmitter of claim 1, wherein:
the controller is further configured to control the DML to establish the target frequency gap of the optical signal output by the DML to be between 0.3 R and 0.5 R.

7. The optical transmitter of claim 1, wherein the OBPF has a 3-dB bandwidth of approximately R/2.

8. The optical transmitter of claim 1, wherein the OBPF comprises a micro-ring resonator (MRR).

9. The optical transmitter of claim 1, wherein:
the controller is further configured to tune a first drive current of the DML for generating the logical one values and tune a second drive current of the DML for generating the logical zero values to establish the target frequency gap between the first frequency and the second frequency of the optical signal.

10. An optical communication system, comprising:
an optical transmitter, comprising:
a directly modulated laser (DML) configured to generate a modulated optical signal in response to a modulation signal, the modulated optical signal comprising a first frequency corresponding to a logical one value in the modulation signal and a second frequency corresponding to a logical zero value in the modulation signal, the modulated optical signal having a modulation symbol rate of "R";
a controller configured to control the DML to establish a target frequency gap between the first frequency and the second frequency;
an optical band pass filter (OBPF) coupled to the DML to receive the modulated optical signal and output a filtered optical signal, the OBPF having a 3-dB bandwidth of less than R; and
an optical receiver communicatively coupled to the optical transmitter and configured to receive the filtered optical signal and pass the filtered optical signal through an equalizer, with the equalizer configured to compensate for a bandwidth limitation in the filtered optical signal caused by the OBPF.

11. The system of claim 10, wherein:
the controller is further configured to establish the target frequency gap based on power of the filtered optical signal output from the OBPF.

12. The system of claim 10, wherein:
the controller is further configured to lock the OBPF with the DML based on power of the filtered optical signal output from the OBPF.

13. The system of claim 10, wherein:
the bandwidth limitation is inter-symbol interference in the filtered optical signal caused by the OBPF.

14. The system of claim 10, wherein:
the controller is further configured to tune a first drive current of the DML for generating the logical one values and tune a second drive current of the DML for generating the logical zero values to establish the target frequency gap between the first frequency and the second frequency of the optical signal.

15. The system of claim 14, wherein the controller is further configured to:
set a bias current of the DML equal to a mathematical mean of the first drive current and the second drive current.

16. A method for optical communication, the method comprising:
modulating a laser to generate an optical signal having a first frequency that corresponds to a logical one value in a modulation signal and a second frequency that corresponds to a logical zero value in the modulation signal, with the optical signal having a modulation symbol rate of "R";
controlling the laser to establish a target frequency gap between the first frequency and the second frequency of the optical signal; and
filtering the optical signal with an optical band pass filter (OBPF), the OBPF having a 3-dB bandwidth of less than R, and outputting the filtered optical signal.

17. The method of claim 16, further comprising:
receiving the filtered optical signal via an optical communication network, with the filtered optical signal being received by a receiving device; and
equalizing the filtered optical signal in an equalizer of the receiving device to compensate for a bandwidth limitation in the filtered optical signal caused by the OBPF.

18. The method of claim 16, further comprising:
locking the laser with the OBPF based on power of the optical signal output from the OBPF.

19. The method of claim 16, further comprising:
tuning the OBPF for maximum power of the optical signal output from the OBPF to lock the laser with the OBPF.

20. The method of claim 16, further comprising:
adjusting a peak transmission frequency of the OBPF to maximize power of the filtered optical signal output from the OBPF to lock the laser with the OBPF.

* * * * *